(12) United States Patent
Moyer (10) Patent No.: US 9,727,500 B2
(45) Date of Patent: Aug. 8, 2017

(54) MESSAGE FILTERING IN A DATA PROCESSING SYSTEM

(71) Applicant: FREESCALE SEMICONDUCTOR, INC., Austin, TX (US)

(72) Inventor: William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 290 days.

(21) Appl. No.: 14/547,297

(22) Filed: Nov. 19, 2014

(65) Prior Publication Data
US 2016/0140062 A1 May 19, 2016

(51) Int. Cl.
G06F 13/00 (2006.01)
G06F 13/24 (2006.01)
G06F 13/40 (2006.01)

(52) U.S. Cl.
CPC .......... *G06F 13/24* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 5,386,517 A | 1/1995 | Sheth et al. | |
| 5,634,070 A | 5/1997 | Robinson | |
| 6,085,277 A * | 7/2000 | Nordstrom | G06F 9/546 |
| | | | 710/263 |
| 6,208,924 B1 | 3/2001 | Bauer | |
| 6,748,444 B1 | 6/2004 | Nagashima | |
| 7,073,020 B1 | 7/2006 | Black et al. | |
| 7,533,207 B2 * | 5/2009 | Traut | G06F 9/45533 |
| | | | 710/260 |
| 7,941,499 B2 | 5/2011 | Bruce et al. | |
| 8,635,410 B1 * | 1/2014 | Kuskin | G06F 12/0822 |
| | | | 711/119 |
| 2005/0125485 A1* | 6/2005 | Tripathi | H04L 69/32 |
| | | | 709/201 |
| 2005/0138249 A1* | 6/2005 | Galbraith | G06F 15/17 |
| | | | 710/100 |

(Continued)

FOREIGN PATENT DOCUMENTS

WO  2013063484 A1  5/2013

OTHER PUBLICATIONS

U.S. Appl. No. 14/547,303, Moyer, W., "Message Filtering in a Data Processing System", Office Action—Non-Final Rejection, mailed Nov. 3, 2016.

(Continued)

*Primary Examiner* — Elias Mamo (57) ABSTRACT

Each processor of a plurality of processors is configured to execute an interrupt message instruction. A message filtering unit includes storage circuitry configured to store captured identifier information from each processor. In response to a processor of the plurality of processors executing an interrupt message instruction, the processor is configured to provide a message type and a message payload to the message filtering unit. The message filtering unit is configured to use the captured identifier information to determine a recipient processor indicated by the message payload and, in response thereto, provides an interrupt request indicated by the message type to the recipient processor.

16 Claims, 7 Drawing Sheets

(56) References Cited

U.S. PATENT DOCUMENTS

| | | | |
|---|---|---|---|
| 2008/0320194 A1* | 12/2008 | Vega | G06F 9/4812 |
| | | | 710/263 |
| 2010/0082944 A1* | 4/2010 | Adachi | G06F 9/3836 |
| | | | 712/200 |
| 2012/0027029 A1* | 2/2012 | Kuila | H04L 69/26 |
| | | | 370/474 |
| 2012/0131309 A1 | 5/2012 | Johnson et al. | |
| 2015/0026678 A1* | 1/2015 | Imada | G06F 9/45533 |
| | | | 718/1 |

OTHER PUBLICATIONS

Notice of Allowance for U.S. Appl. No. 14/547,303 dated Apr. 7, 2017, 16 pages.

Heymann et al., "Preserving Message Integrity in Dynamic Process Migration", Parallel and Distributed Processing Conference 1998, 10 pages.

* cited by examiner

| BITS | NAME | DESCRIPTION |
|---|---|---|
| (32:36) | TYPE | MESSAGE TYPE. THE TYPE OF MESSAGE (ENCODED IN TYPE FIELD). VALID MESSAGE TYPES ACCEPTED BY PROCESSOR ARE:<br>0 - DBELL. A PROCESSOR DOORBELL EXCEPTION IS GENERATED IF THE MESSAGE IS ACCEPTED.<br>1 - DBELL_CRIT. A PROCESSOR DOORBELL CRITICAL EXCEPTION IS GENERATED IF THE MESSAGE IS ACCEPTED.<br>2 - G_DBELL. A GUEST PROCESSOR DOORBELL EXCEPTION IS GENERATED IF THE MESSAGE IS ACCEPTED.<br>3 - G_DBELL_CRIT. A GUEST PROCESSOR DOORBELL CRITICAL EXCEPTION IS GENERATED IF THE MESSAGE IS ACCEPTED.<br>4 - G_DBELL_MC. A GUEST PROCESSOR DOORBELL MACHINE CHECK EXCEPTION IS GENERATED IF THE MESSAGE IS ACCEPTED. |
| (37) | BRDCAST | BROADCAST. THE MESSAGE IS ACCEPTED BY ALL PROCESSORS REGARDLESS OF THE VALUE OF PIRTAG. PIRTAG AND LPIDTAG DETERMINE WHETHER THE MESSAGE IS ACCEPTED IT OR NOT.<br>0 - NOT A BROADCAST. PIRTAG AND LPIDTAG DETERMINE WHETHER THE MESSAGE IS ACCEPTED IT OR NOT.<br>1 - THE MESSAGE IS ACCEPTED REGARDLESS OF THE VALUE OF PIRTAG IF LPIDTAG = LPIDR. |
| (42:49) | LPIDTAG | LPID TAG. THE MESSAGE IS ONLY ACCEPTED IF LPIDTAG = LPIDR, REGARDLESS THE VALUES OF PIRTAG OR BRDCAST. |
| (50:63) | PIRTAG | PIR TAG. THIS FIELD IS USED TO IDENTIFY A PARTICULAR PROCESSOR. THE CONTENTS OF THIS FIELD ARE COMPARED WITH BITS 18:31 OF THE PIR REGISTER FOR DBELL AND DBELL_CRIT TYPE MESSAGES. THE CONTENTS OF THIS FIELD ARE COMPARED WITH BITS 18:31 OF THE GPIR REGISTER FOR G_DBELL, G_DBELL_CRIT, AND G_DBELL_MC TYPE MESSAGES.<br>IF THE PIRTAG MATCHES OR BRDCAST IS SET, AND LPIDTAG = LPIDR, THEN THE MESSAGE IS ACCEPTED. |

| ADDRESS BUS | TRANSFER SIZE | WRITE DATA BUS | WRITE DATA STROBES | TRANSFER TYPE | ACCESS TYPE |
|---|---|---|---|---|---|
| TARGET LOCATION (DOMAINS, SUBSYSTEMS, VIRTUAL) PROCESSORS | 00 | MESSAGE PAYLOAD 0 | 0000000 | IDLE | TARGET MESSAGE |
| | 01 | | | | BROADCAST MESSAGE |
| PHYSICAL PROCESSOR ID | 10 | UPDATE VALUES | 0000000 | IDLE | PIR, GPIR UPDATE VALUE |
| | 11 | | | | LPIDR UPDATE VALUE |

FIG. 9

MESSAGE FILTERING IN A DATA PROCESSING SYSTEM

CROSS-REFERENCE TO RELATED APPLICATION(S)

This application is related to U.S. patent application Ser. No. 14/547,303, filed on even date, entitled "MESSAGE FILTERING IN A DATA PROCESSING SYSTEM," naming William C. Moyer as inventor, and assigned to the current assignee hereof.

BACKGROUND

Field

This disclosure relates generally to data processing systems, and more specifically, to message filtering in a data processing system.

Related Art

In a multiple processor data processing systems, inter-processor interrupt messaging allows a processor to send an interrupt message to other processors or devices within the data processing system. For example, a processor can initiate a message send instruction which specifies both a message type and message payload in a general purpose register. This message is sent to all processors and devices, including the sending processor) within a particular domain. Each processor and device receives all sent messages and upon receipt of each message, the processor or device examines the message type and payload to determine whether the device or processor should accept the message. If a message is accepted, the accepting processor or device takes specified actions based on the message type. This inter-processor interrupt messaging requires each processor or device to have the ability to locally determine whether a message is accepted. Also, a delivery mechanism is required to deliver all messages to all processors and devices. In one such system, inter-processor interrupt messaging is performed within a memory coherency domain in which cache coherency snooping mechanisms are used to implement the messaging. However, these cache coherency snooping mechanisms are not available in all systems. Other systems utilize an independent distributed messaging interface between multiple processors in the system. However, this results in increased cost. Therefore, a need exist for an improved interrupt messaging system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a multiple processor data processing system, a centralized messaging unit (CMU) is used to control delivery of inter-processor interrupt messages. An inter-processor interrupt message (generated, for example, in response to a message send processor instruction) specifies a message type and a message payload. The message type and payload is used to determine which processor(s) or device(s) should accept the message based on information identifiers of each processor, and parameters within the message payload. The CMU receives all interrupt messages and determines the intended recipient(s) which should accept each message. In order to do so, the CMU samples and captures identifier information from each processor, such as each time a processor updates any of its identifier information. The CMU uses this captured identifier information to determine the intended recipients for each received message. The CMU then delivers an interrupt request indicated by the message type to the appropriate recipient(s). Furthermore, in one embodiment, messages of the same type to the same recipient within a predetermined interval of time can be coalesced such that a single interrupt request representative of multiple accepted messages may be delivered to the appropriate recipient. Since the CMU performs the filtering of the messages to determine which recipient(s) should accept a message, a recipient need not perform any additional examination of the message to determine whether or not to accept the message.

Figure 1:
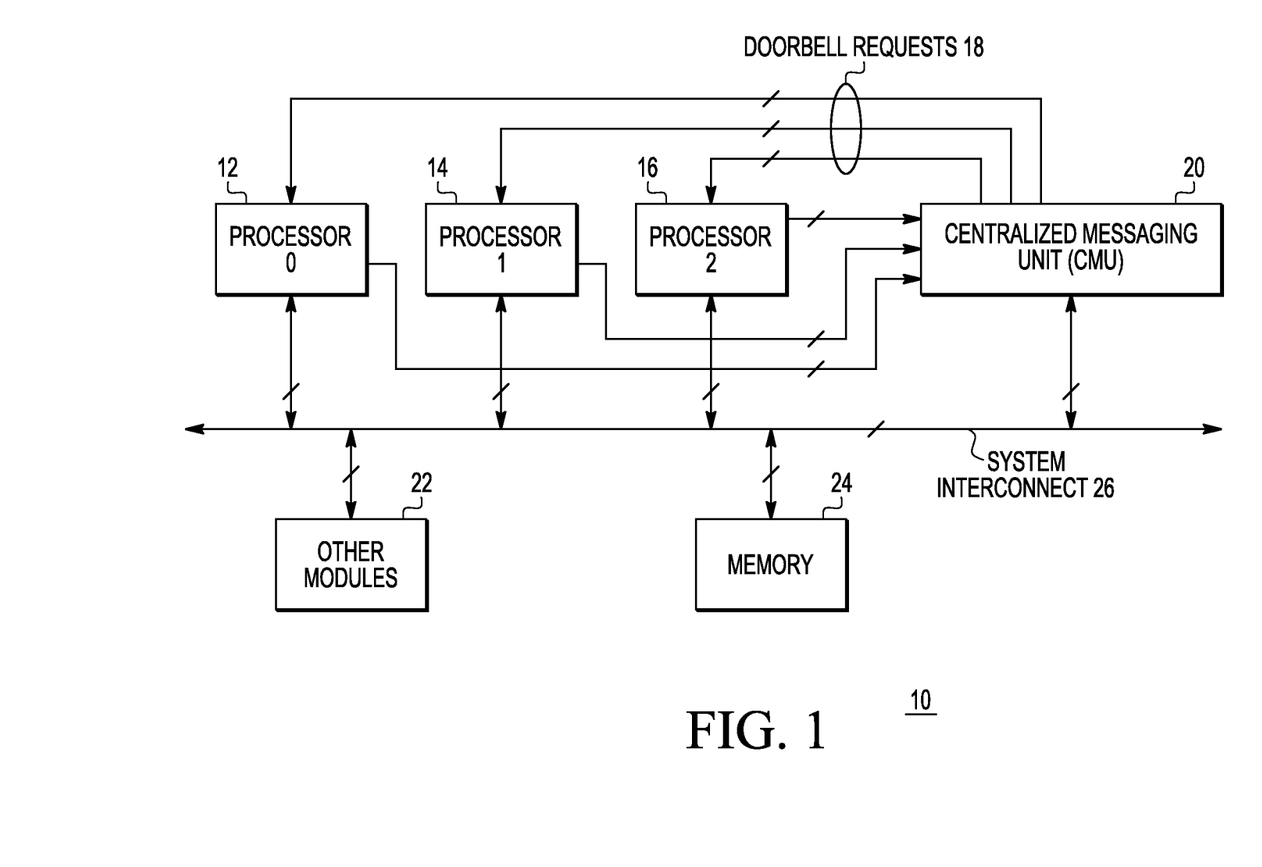
FIG. 1 illustrates, in block diagram form, a data processing system in accordance with an embodiment of the present invention.

FIG. 1 illustrates a data processing system 10 having a system interconnect 26, a processor 0 12, a processor 1 14, a processor 2 16, and a CMU 20, each bidirectionally coupled to system interconnect 26. System 10 may include any number of other modules 22 and a memory 24. System 10 is illustrated as having three (3) processors, but can have any number, e.g. one or more, processors. As will be described in more detail below, CMU 20 is coupled to each of processor 0, processor 1, and processor 2 to periodically receive and sample identifier information, and to receive, filter, and then send messages from/to each processor. CMU 20 provides doorbell requests to each of processor 0, processor 1, and processor 2. Each of processor 0, 1, and 2 may send a message to each processor of system 10 by way of CMU 20. CMU 20, in response to the messages, determines the intended targets and asserts the appropriate doorbell requests to those intended target(s).

In one embodiment, system 10 is a hypervisor based system which incorporates the notion of a "logical partition" which is a group of virtual (i.e. guest) processor resources. In this embodiment, at any point in time, the underlying hardware of system 10 is executing instructions for the hypervisor, or on behalf of a virtual guest processor executing within a logical partition. The hypervisor is a layer of software which lies above the traditional "supervisor" mode of privilege level and provides the illusion that the guest supervisor code is running on a virtual processor of its own, which is identified with a guest processor identifier value.

Figure 6:
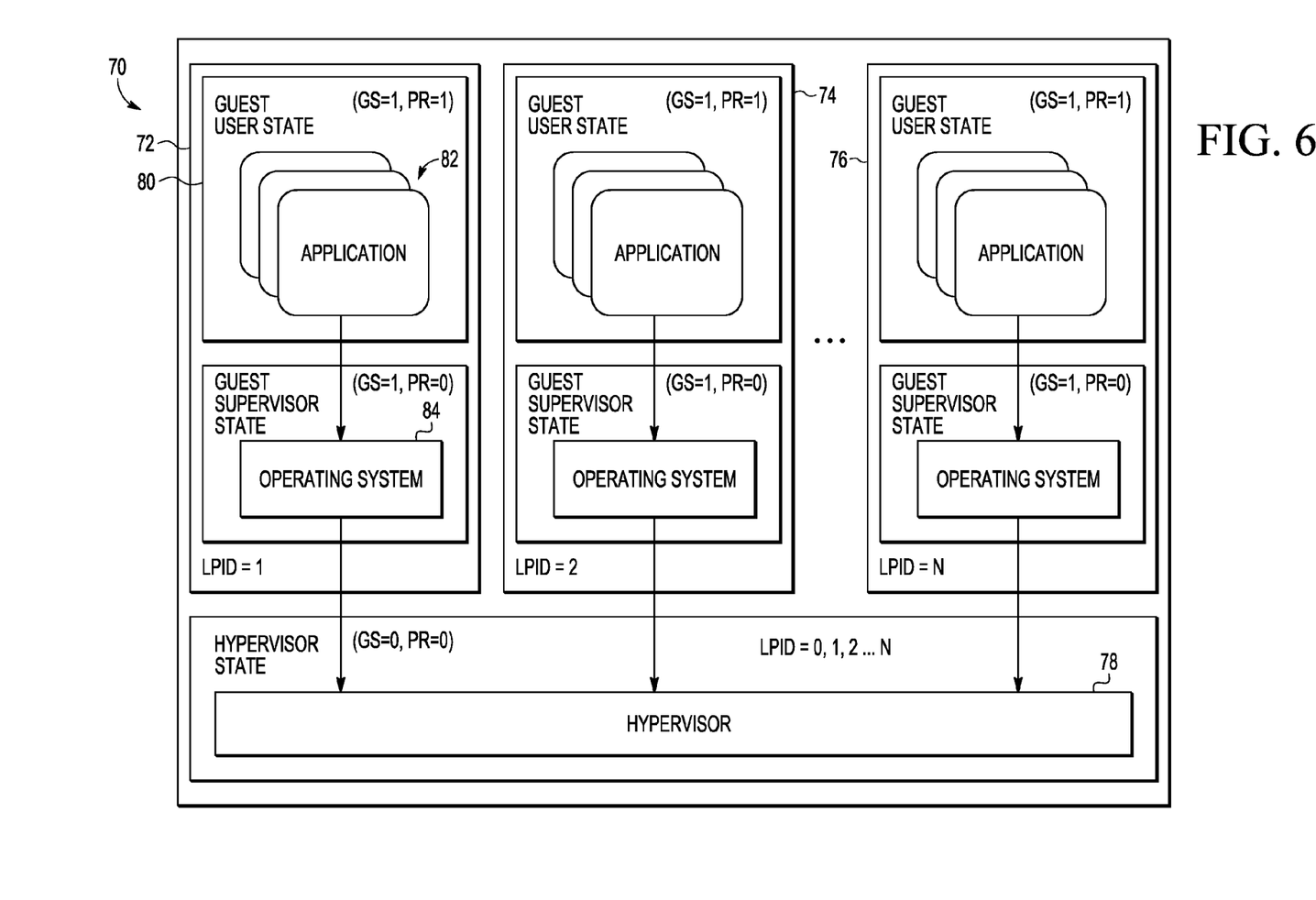
FIG. 6 illustrates, in diagrammatic form, an exemplary logical partitioning of a data processing system.

For example, FIG. 6 illustrates a representation of system 10 as a multi-partitioned hypervisor based system 70. Hypervisor based system 70 includes a hypervisor 78 and N logical partitions each having a corresponding logical partition ID (LPID). The logical partitioning is the subdivision of the physical environment of system 10 into separate, secure logical partitions. The partitions can operate independently of each other, and individual physical resources may be either shared, or may be assigned explicitly to a logical partition, and are managed by hypervisor 78. Each logical partition includes a guest supervisor state which runs an operating system within the logical partition, and a guest user state which includes any number of applications which may be executed by the operating system in the logical partition. For example, logical partition 72 has an LPID of 1, and includes a guest supervisor state which executes an operating system 84 and a guest user state with applications 82 under control of operating system 84. Note that since each logical partition is independent of each other, each operating system within system 70 may be a different operating system.

Virtualization is the emulation of a virtual machine that is presented to a logical partition. Virtualization is generally provided by a combination of hardware and software mechanisms. Hypervisor 78 is a low-level software program that presents a virtual machine to an operating system running in a logical partition. The hypervisor may manage the multiple virtual machines and logical partitions, even on a single processor, in a manner analogous to how an operating system switches processes.

Figure 2:
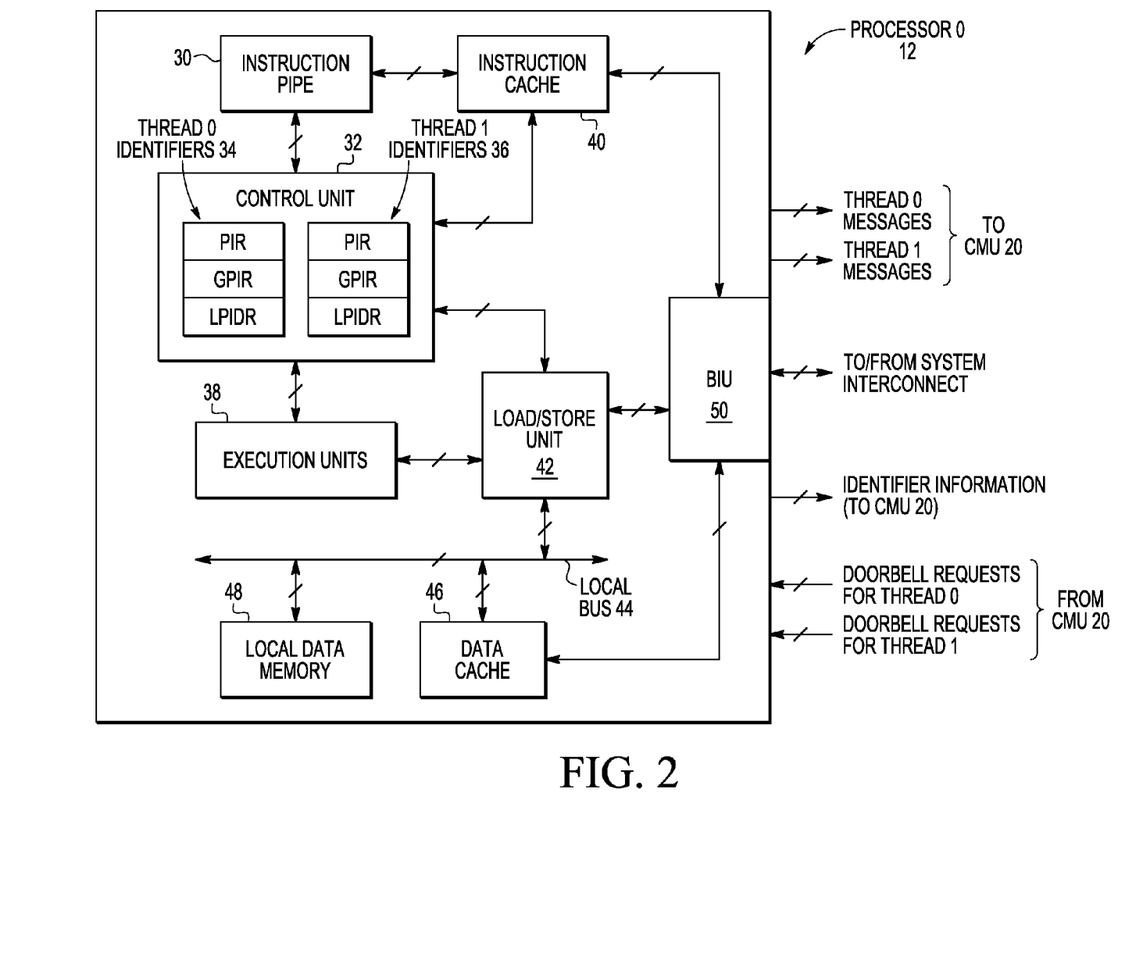
FIG. 2 illustrates, in block diagram form, a processor of FIG. 1 in accordance with an embodiment of the present invention.

FIG. 2 illustrates processor 0 12 in accordance with one embodiment of the present invention. Processor 0 includes an instruction pipe 30, an instruction cache 40, a control unit 32, a bus interface unit (BIU) 50, a load/store unit 42, execution units 38, a local bus 44, a data cache 46, and a local data memory 48. Instruction pipe 30 is bidirectionally coupled to instruction cache 40 and control unit 32, load/store unit 42 is bidirectionally coupled to control unit 32, execution units 38, and BIU 50. Instruction cache 40 and data cache 46 are each bidirectionally coupled to BIU 50. Execution units 38 is bidirectionally coupled to control unit 32. Load/store unit 42, data cache 46, and local data memory 48 are each bidirectionally coupled to local bus 44. Control unit 32 includes storage circuitry which stores thread0 identifiers 34 and thread1 identifiers 36. Thread0 identifiers 34 include a processor identifier register (PIR), a guest processor identifier register (GPIR), and a logical partition identifier register (LPIDR), in which each register stores the corresponding identifier for thread0. Thread1 identifiers 36 include a PIR, a GPIR, and a LPIDR, in which each register stores the corresponding identifier for thread1.

In operation, processor 0 is a multi-threaded processor capable of executing up to two threads, thread0 and thread1. However, in alternate embodiments, processor 0 may be capable of executing more threads, in which control unit 32 includes a set of identifier registers, such as identifiers 34 and 36, for each thread. Instruction pipe 30 fetches processor instructions from instruction cache 40, or, if not present within cache 40, from memory 24 by way of BIU 50. Instruction pipe 30 decodes the received instructions and provides them to execution units 38 which perform the function indicated by each instruction. Execution units 38 accesses load/store unit 42 as needed to obtain data or store data as indicated by an instruction. Load/store unit 42 performs loads and stores from and to local data memory 48, data cache 46, or memory 24 by way of BIU 50.

Referring to thread0 identifiers 34, the PIR register holds the processor ID which is used to distinguish physical processors in a system from one another. Therefore, each PIR register is initialized to a unique value. In the case in which system 10 is a hypervisor based system, each thread also has a corresponding guest processor ID and logical partition ID. Therefore, in this case, the GPIR holds the guest processor ID which is used to distinguish guest processors in a logical partition from one another. In a multiprocessor system, like system 10, each GPIR in a logical partition is initialized at partition creation time by the hypervisor to a unique value in the logical partition. The guest processor ID may be independent of the PIR contents, and may represent a "virtual" processor ID. The LPIDR holds the logical partition ID which is used to distinguish a logical partition from one another. The LPIDR can also be initialized at partition creation time by the hypervisor to a unique value among other logical partitions. Note that a logical partition may refer to a processor of system 10 or a thread of system 10. In the illustrated embodiment, depending on the logical partitioning, each of thread0 and thread1 is part of a logical partition. The same descriptions apply to the PIR, GPIR, and LPIDR of thread1 identifiers 36.

Processor 0 may execute a message send instruction in either thread0 or thread1, which initiates a message to be sent to another processor, or may in some instances initiate a message to be sent to itself. FIG. 4 illustrates, in diagrammatic form, a message send instruction which specifies a message type and a message payload in a general purpose register (GPR). In the illustrated embodiment, the message type is provided in bits 32-36 of the specified GPR, and the payload is provided in bits 37-63 of the GPR. Upon execution of a message send instruction, processor 0 sends an interrupt message to CMU 20, containing the message type and the message payload. If a message send instruction is executed in thread0, then an interrupt message is sent by way of thread0 messages to CMU 20, and if a message send is executed in thread1, then an interrupt message is sent by way of thread1 messages to CMU 20. CMU 20, as will be described in more detail below with respect to FIG. 3, filters these messages based on previously captured values of PIR, GPIR, and LPIDR for each processor thread in system 10.

Figure 5:
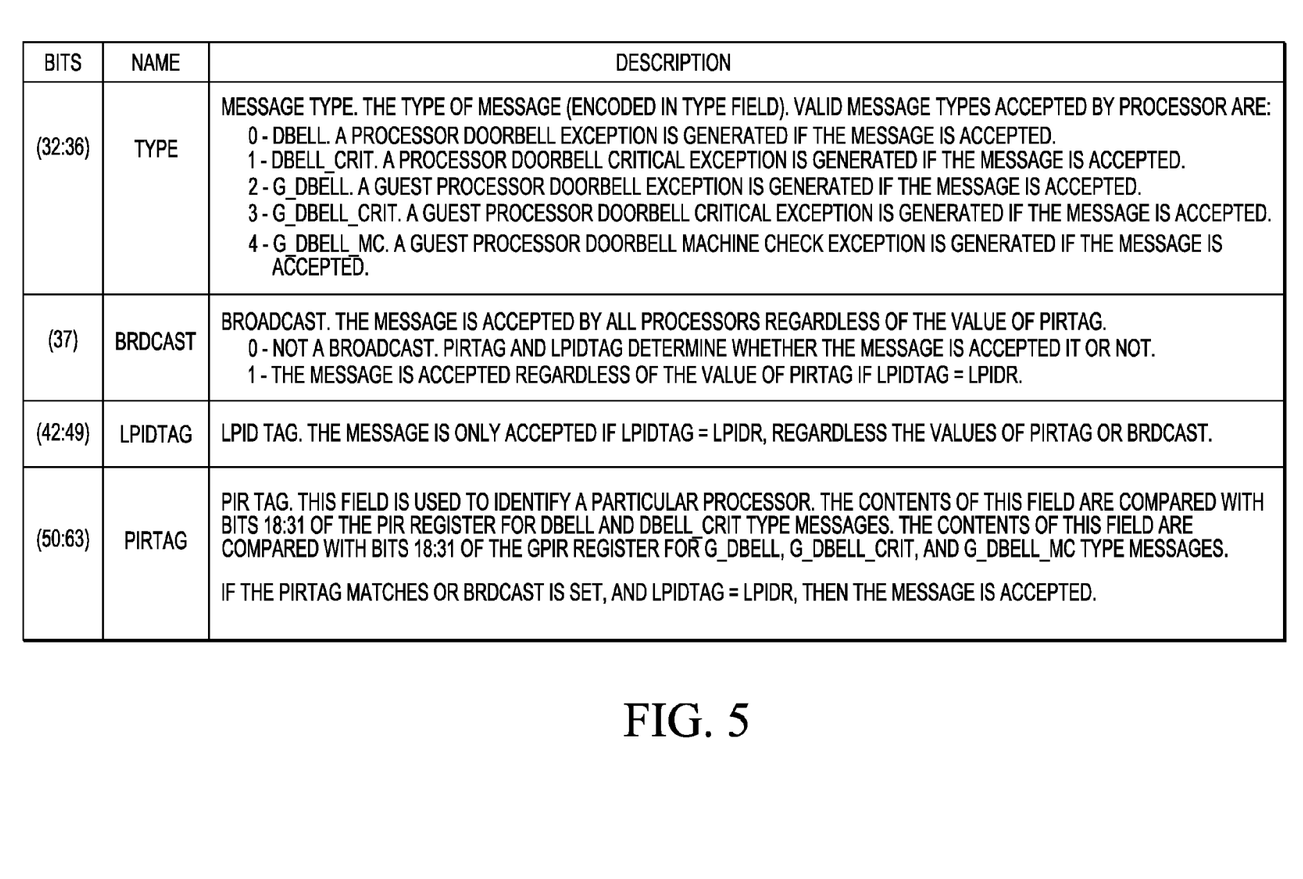
FIG. 5 illustrates, in table form, field descriptions of the fields of the message send instruction.

FIG. 5 illustrates, in table form, various descriptions for the fields of the GPR associated with the message send instruction. As indicated in table 5, bits 32-36 identify the message type and may be referred to as the type field (TYPE). The type of messages encoded by the type field correspond to doorbell requests. Doorbell requests (also referred to as interrupt requests) are referred to as such because the message payload is only used to determine which processor accepts the message. If the type field is 0, the message type is a processor doorbell request (DBELL). A processor doorbell request generates a processor doorbell interrupt (i.e. a processor doorbell exception) if the message is accepted. If the type field is 1, the message type is a processor doorbell critical request (DBELL_CRIT). A processor doorbell critical request generates a processor doorbell critical interrupt (i.e. a processor doorbell critical exception) if the message is accepted. A DBELL_CRIT has a higher interrupt priority than a DBELL. If the type field is a 2, the message type is a guest processor doorbell request (G_DBELL). A guest processor doorbell request generates a guest processor doorbell interrupt (i.e. a guest processor doorbell exception) if the message is accepted. If the type field is a 3, the message type is a guest processor doorbell critical request (G_DBELL_CRIT). A guest processor doorbell critical request generates a guest processor doorbell interrupt (i.e. a guest processor doorbell critical exception) if the message is accepted. If the type field is a 4, the message type is a is a guest processor doorbell machine check request (G_DBELL_MC). A guest processor doorbell machine check request generates a guest processor doorbell machine check exception if the message is accepted. A G_DBELL_CRIT has a higher interrupt priority than a G_DBELL, and a G_DBELL_MC has a higher interrupt priority than a G_DBELL_CRIT. Guest doorbell requests are targeted to the guest operating system running on a thread (or threads) in a hypervisor-based system. Regular doorbell requests are targeted to the hypervisor layer of software in a hypervisor-based system, or to a normal operating system layer, in a non-hypervisor system.

Still referring to the table of FIG. 5, bits 37 and 42-63 provide the message payload. The payload is provided to CMU 20 so that it may determine whether a processor should accept a message. The examination of the payload to determine the appropriate recipients of a message (to determine which processor(s) should accept a message) is referred to as message filtering. Bit 37 of the payload is the broadcast field (BRDCAST). If this field is a 0, the message is not a broadcast. In this case, the PIRTAG and LPIDTAG of the message payload are used by CMU 20 to determine whether the message should be accepted or not for each processor. If this field is a 1, CMU 20 accepts the message regardless of the value of PIRTAG if LPIDTAG matches the previously captured LPIDR for the appropriate processor and thread. Bits 42-49 of the payload provide the LPIDTAG. CMU 20 only accepts this message if LPIDTAG of the payload matches the previously captured LPIDR for the appropriate processor and thread, regardless of the values of PIRTAG or BRDCAST. Bits 50-63 of the payload provide the PIRTAG. This field is used to identify a particular processor. CMU 20 compares the contents of this field with the previously captured PIR contents for the appropriate processor and thread for DBELL and DBELL_CRIT type message. CMU 20 compares the contents of this field with the previously captured GPIR contents for the appropriate processor and thread for G_DBELL, G_DBELL_CRIT, and G_DBELL_MC type messages. If the PIRTAG matches the previously captured PIR (or captured GPIR) for the appropriate processor and thread or BRDCAST is set and LPIDTAG matches the captured LPID for the appropriate processor and thread, CMU 20 accepts the message on behalf of the processor. For any accepted message, CMU 20 delivers a doorbell request (i.e. interrupt request) indicated by the message type of the accepted message to the appropriate recipient processor thread.

In the case in which system 10 is a hypervisor based system, the DBELL and DBELL_CRIT messages are selectively accepted based on both the previously captured PIR and LPIDR values for a thread. Furthermore, for a DBELL message type to generate an interrupt on a recipient processor as determined by CMU 20, the processor should have the guest supervisor state enabled or external exceptions enabled. For a DBELL_CRIT message type to generate an interrupt on a recipient processor thread as determined by CMU 20, the processor thread should have the guest supervisor state enabled or critical exceptions enabled. Each of the DBELL and DBELL_CRIT message types are directed to threads of particular processors. The G_DBELL, G_DBELL_CRIT, and G_DBELL_MC messages are selectively accepted based on the previously captured LPIDR and GPIR values for a thread. Furthermore, for a G_DBELL message type to generate an interrupt on a recipient processor thread as determined by CMU 20, the processor thread should have the guest supervisor state enabled and external interrupts enabled. For a G_DBELL_CRIT message type to generate an interrupt on a recipient processor thread as determined by CMU 20, the processor thread should have the guest supervisor state enabled and critical interrupts enabled. For a G_DBELL_MC message type to generate an interrupt on a recipient processor thread as determined by CMU 20, the processor thread should have the guest supervisor state enabled and machine check exceptions enabled. Note that G_DBELL, G_DBELL_CRIT, and G_DBELL_MC message types are directed to the hypervisor (e.g. hypervisor 78) and will only interrupt when the guest is in execution. These messages are used by the hypervisor software to "reflect", or emulate a particular type of asynchronous interrupt (external exception, critical exception, or machine check exception) to the guest operating system. In a hypervisor based system, the payload may indicate any target location by setting the LPIDTAG and PIRTAG accordingly. In this case, the target location may be a particular domain, subsystem, processor, virtual processor, etc., depending on how system 10 is partitioned by the logical partitions and how the hypervisor is implemented.

In the case in which system 10 is not a hypervisor based system, note that only DBELL and DBELL_CRIT messages are available and are based only on the previously captured PIR contents for the appropriate processor and thread. For example, if BRDCAST is enabled, then the message is accepted regardless of the value of PIRTAG, and if BRDCAST is not enabled, then the message is accepted if PIRTAG matches the previously captured PIR contents. When not a hypervisor based system a target location indicated by the payload may be a processor or virtual processor or thread.

In response to a doorbell request, the receiving processor thread can perform one or more predefined actions, such as accessing a predetermined memory location or a shared data structure. In alternate embodiments, different message types may be defined by the message type, including additional types of doorbell requests or other types of interrupt requests.

Figure 3:
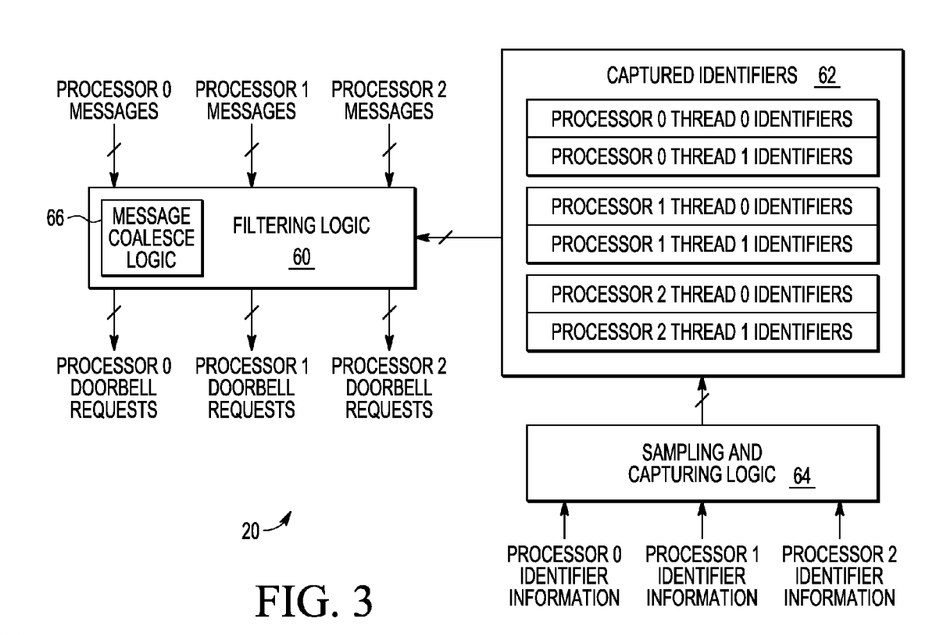
FIG. 3 illustrates, in block diagram form, a centralized messaging unit (CMU) of FIG. 1 in accordance with an embodiment of the present invention.
Figure 4:
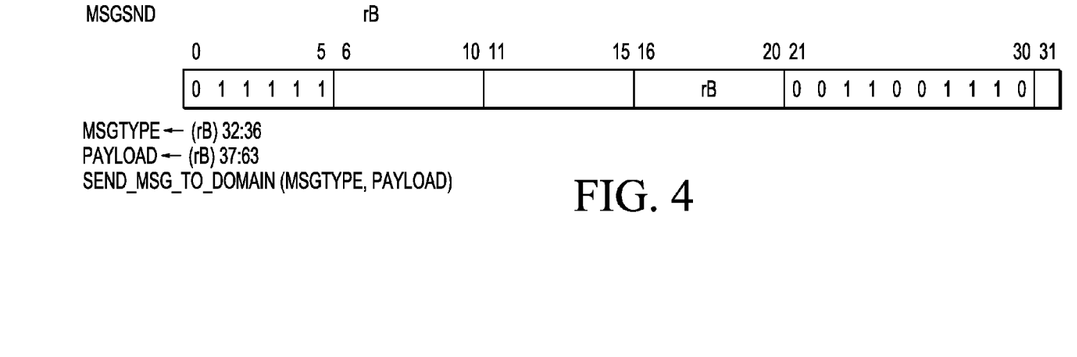
FIG. 4 illustrates, in diagrammatic form, a message send instruction.

FIG. 3 illustrates, in block diagram form, CMU 20 in accordance with one embodiment of the present invention. CMU 20 includes filtering logic 60, captured identifiers 62, and sampling and capturing logic 64. Filtering logic 60 includes message coalesce logic 66 and receives messages from each processor in system 10, such as processor 0, processor 1, and processor 2. When a processor transmits an interrupt message upon execution of a send message instruction within a thread, the processor provides the message type and payload from its GPR to filtering logic 60 of CMU 20. Filtering logic 60 may have an input for each thread of a processor or may receive a thread identifier with each processor message. Filtering logic provides doorbell requests (of the various types described above) to each processor of system 10. The doorbell requests for each processor are specific to a particular thread and therefore may be provided separately to each processor thread. For example, filtering logic may have one output for processor 0 thread 0 doorbell requests and another output for processor 0 thread 1 doorbell requests. Filtering logic is coupled to receive information from captured identifiers 62. Captured identifiers 62 includes storage circuitry which stores captured identifiers for each thread and processor. For example, captured identifiers 62 includes storage circuitry for processor 0 thread0 identifiers, processor 0 thread1 identifiers, processor 1 thread0 identifiers, processor 1 thread1 identifiers, processor 2 thread0 identifiers, and processor 2 thread1 identifiers. These identifiers may each store the captured PIR, GPIR, and LPIDR values received from each processor for each thread at the time these values are updated within the processor.

Captured identifiers 62 is coupled to receive sampled and captured identifier information from sampling and capturing logic 64. Sampling and capturing logic 64 receives processor 0 identifier information, processor 1 identifier information, and processor 2 identifier information. The identifier information can include the PIR, GPIR, and LPIDR values for each thread. For example, processor 0 identifier information may include PIR, GPIR, and LPIDR from thread0 identifiers 34 of processor 0 and may include PIR, GPIR, and LPIDR from thread1 identifiers 36. Each set of identifiers (corresponding to identifiers 34 and 36) may be provided independently to CMU 20. In one embodiment, these identifier values from the processors of system 10 are sampled each time they are updated by the corresponding processor. In this manner, captured identifiers 62 always store current (up to date) identifier information. For example, if processor 0 updates GPIR or LPIRD of thread1, then the information of thread1 identifiers 36 is provided to sampling and capturing logic 64. Sampling and capturing logic 64 then stores this information into the appropriate location within captured identifiers 62. In one embodiment, this identifier information is provided to sampling and capturing logic 64 by direct signaling. Alternatively, idle bus transactions may be used, as will be described in more detail below.

Filtering logic 60 of CMU 20 receives messages from the processors of system 10, and uses the captured identifiers and the received payload of the messages to determine which processor(s) of system 10 should accept the messages. Therefore, filtering logic 60 may include comparators and other logic, as needed, to examine and filter incoming messages to determine which processors, if any, should accept the message. All send messages from the processors of system 10 are filtered by filtering logic 60. For each received message, filtering logic 60 filters the payload to determine which processor(s) should accept the message. For each processor thread which is determined to accept the message, filtering logic 60 sends an appropriate doorbell request (as indicated by the message type of the send message) to the processor thread. Note that the recipient processor of a doorbell request need not perform any filtering or examination of the received doorbell requests, because they are known to be accepted. The determination of acceptance is performed by CMU 20 and not by each individual processor of system 10.

In one embodiment, as described above, for each accepted message, CMU 20 delivers a doorbell request to the appropriate processor or processor thread without coalescing accepted messages. In an alternate embodiment, message coalesce logic 66 of CMU 20 may improve doorbell signaling efficiency by coalescing accepted messages of the same message type for a particular processor or processor thread and sending a single doorbell request to the recipient processor or processor thread representative of the multiple accepted messages. For example, multiple accepted messages for a particular processor or processor thread that are of the same message type and received within a particular interval of time may be coalesced by message coalesce logic 66 such that a single doorbell request can be sent at the end of the particular interval of time.

Figure 7:
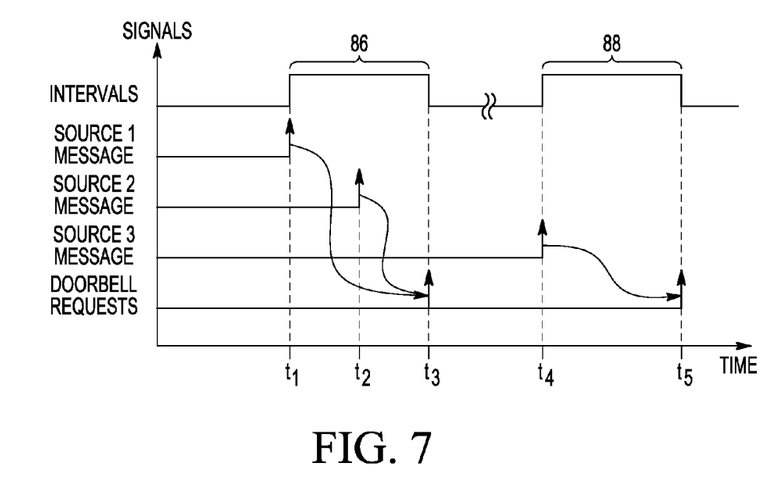
FIG. 7 illustrates, in timing diagram form, signals of system 10 in accordance with one embodiment of the present invention.

FIG. 7 illustrates, in timing diagram form, various signals of system 10 in accordance to one embodiment which utilizes message coalesce logic 66. In FIG. 7, a first message is accepted by filtering logic 60 at time t1. The first accepted message can be from any source within system 10 (indicated as source 1), such as, for example, any processor in system 10. The first accepted message indicates that a doorbell request indicated by the message type is to be delivered to an indicated recipient processor thread, as was described above. At time t1, counter logic within message coalesce logic 66 may begin tracking an interval of time 86. Interval of time 86 may be a predetermined window of time which is initiated by an accepted message. No doorbell request in response to the first accepted message is sent until interval 86 is complete. At time t2, a second message from another source within system 10 (indicated as source 2) is accepted by filtering logic 60 within interval 86. The second accepted message indicates that a doorbell request of the same message type as indicated by the first accepted message is to be delivered to a same indicated recipient processor thread as indicated by the first accepted message. Therefore, the first and second accepted messages can be coalesced by coalesce logic 66 such that a single doorbell request can be sent to the indicated recipient processor thread representative of both the first and second accepted messages. At time t3, interval 86 ends and a single doorbell request is delivered to recipient processor thread.

Still referring to FIG. 7, at a subsequent time t4, a third message is accepted by filtering logic 60 from another source within system 10 (indicated in source 3). Note that sources 1, 2, and 3 can be different sources, or any two or all three may be the same source. At time t4, since no interval is currently being tracked, a next interval 88 is started by coalesce logic 66. At time t5, interval 88, which may be of the same duration as interval 86, ends. Since no other messages of the same message type for the same recipient processor thread has been received, a doorbell request representative of only the third message is delivered to the recipient processor thread.

Figure 8:
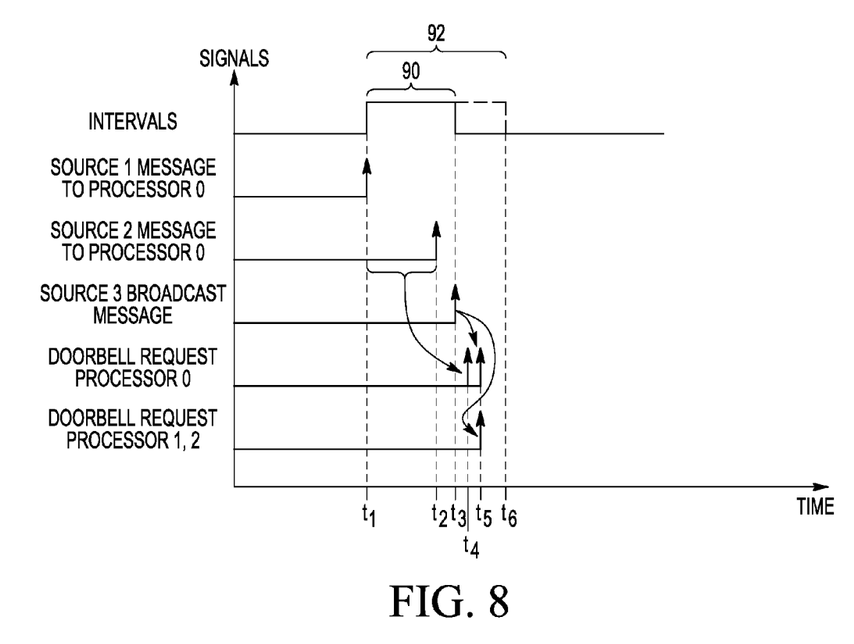
FIG. 8 illustrates, in timing diagram form, signals of system 10 in accordance with one embodiment of the present invention.

FIG. 8 illustrates, in timing diagram form, various signals of system 10 in which the predetermined interval of time in which to coalesce messages is truncated in response to a broadcast message. In the example of FIG. 8, at time t1 a first message from any source (indicated as source 1) intended for a thread of processor 0 is accepted by filter logic 60. Coalesce logic 66 begins interval of time 92. At time t2, a second message from any source (indicated as source 2) intended for the same thread of processor 0 and of the same message type as the accepted first message. Therefore, coalesce logic 66 can coalesce both the first and second accepted messages and respond to the indicated thread of processor 0 with a single doorbell request at the end of interval 92. However, at time t3, a broadcast message is received from any source (indicated as source 3) and is accepted on behalf of all processors. Note that sources 1, 2, and 3 can be different sources, or any two or all three may be the same source. Due to the acceptance of a broadcast message, interval 92 is truncated prior to completion of the full interval, resulting in a shortened interval 90. That is, acceptance of a broadcast message reduces the duration of the initial interval. After the end of truncated interval 90, at time t4, a single doorbell request is sent to the indicated recipient processor thread representative of both the first and second accepted messages. At time t5, a doorbell request in response to the accepted broadcast message is sent to each of processors 0, 1, and 2. The doorbell requests to each of processors 0, 1, and 2 are sent simultaneously to each other, or substantially simultaneously with each other (such as within a small amount of time of each other.) Without CMU 20, a broadcast message would be sent to each recipient processor independently for filtering and thus the broadcasts may not actually be received or accepted simultaneously. However, with CMU 20 filtering all messages in system 10, CMU 20 can filter a broadcast message and broadcast doorbell requests such that each recipient may receive them simultaneously or substantially simultaneously.

Still referring to FIG. 8, note that times t4 and t5 occur after t3 (which corresponds to the end of truncated interval 92) in which the doorbell request at time t4 is delivered in response to the coalesced messages and the doorbell requests at time t5 are delivered in response to the broadcast message. Alternatively, t4 may occur after t5. Furthermore, in one embodiment, the doorbell requests in response to the broadcast message to each of processors 0, 1, and 2 may be sent at different times and in any order. Time t6 in FIG. 8 corresponds to the end of interval 92 had it not been truncated or shortened in response to the accepted broadcast message.

In one embodiment, the send messages from the processors are sent to CMU 20 via direct signaling. In an alternate embodiment, CMU 20 monitors "send message" operations on system interconnect 26 which are disguised as an IDLE bus transaction, and then distributes processor doorbell message interrupts via hardwired doorbell request signals, based on the appropriate filtering rules for the doorbell message. Note that an interrupt controller of a processor is not involved in these operations of receiving send messages, filtering send messages, and directing and delivering doorbell requests.

Figure 9:
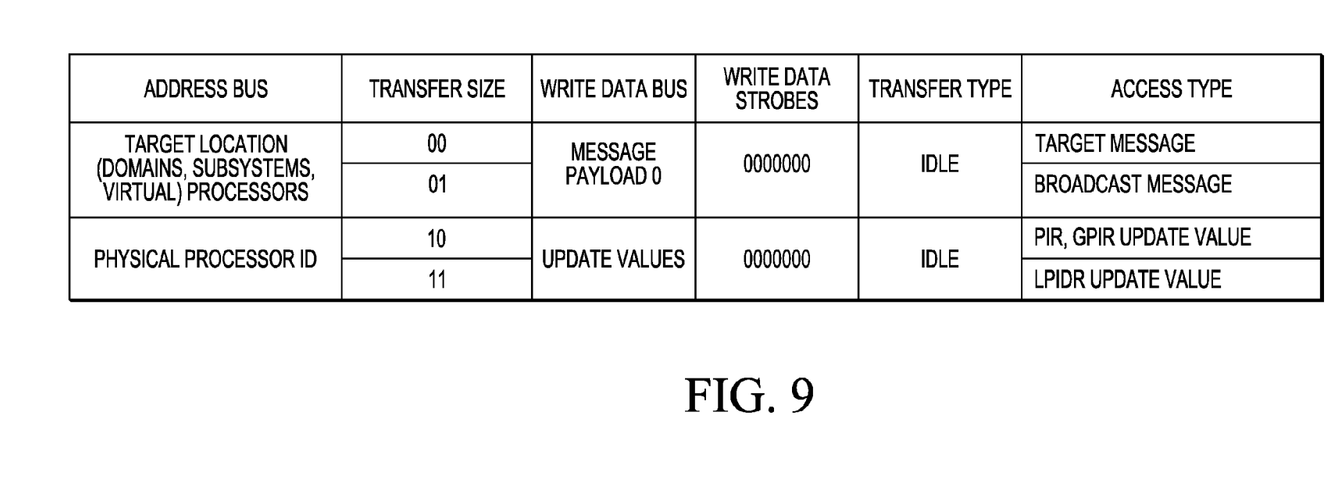
FIG. 9 illustrates, in diagrammatic form, a signaling scheme in accordance with one embodiment of the present invention.

As illustrated in FIG. 1, update and messaging information can be provided directly from each processor in system 10 to CMU 20, and not by way of system interconnect 26. However, in an alternate embodiment, extended signaling may be used to provide this type of information by way of system interconnect 26. In one embodiment, IDLE bus cycles on system interconnect 26 may be used to disguise both message payloads and update values. FIG. 9 illustrates a table with extended signaling for system interconnect 26. For each bus transaction on system interconnect 26, a value can be provided for an address bus, a transfer size, a write data bus, a write data strobes, and a transfer type. In one embodiment, the transfer size being set to 00, 01, 10, or 11 indicates that a message payload or an update value is being provided by way of an IDLE bus cycle. Therefore, CMU 20 can monitor bus transactions until one of these extended IDLE bus cycles is detected. For example, with a transfer size of 00 or 01, the target locations and message payload may be provided for a targeted message or broadcast message, respectively. With a transfer size of 10, the write data bus may provide the PIR, GPIR update values for a particular physical processor and thread ID on the address bus. With a transfer size of 11, the write data bus may provide the LPIDR update value for a particular physical processor ID on the address bus. In this manner, these messaging operations can be overlaid onto an existing bus protocol through the use of IDLE bus transactions. This prevents the need for direct signaling lines.

Therefore, by now it can be understood how a centralized filtering unit may be used to implement inter-processor interrupt messaging. The centralized filtering unit may sample and capture identifier information to ensure that the most current identifier information is stored for each processor. Each interrupt message is sent to the centralized filtering unit so that it may filter the message by examining the message payload and using the previously captured and stored identifier information. Upon determining the intended one or more recipients of a message, the centralized filter unit delivers the appropriate interrupt request, such as a doorbell request, to the one or more intended recipients. Furthermore, in one embodiment, accepted messages of the same type to the same recipient within a predetermined interval of time can be coalesced such that a single interrupt request representative of multiple accepted messages may be delivered to the appropriate recipient. Note that a recipient can be a processor, a processor thread, logical partition, guest processor, etc. Also, the recipient need not further examine or filter the messages or interrupt requests since they have already been determined as accepted by the centralized filtering unit for the recipient.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In one embodiment, the illustrated elements of system 10 are circuitry located on a single integrated circuit or within a same device. Alternatively, system 10 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, system 10 may be a hypervisor based system or may not implement a hypervisor. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes a system interconnect; a plurality of processors coupled to the system interconnect, each of the plurality of processors configured to execute a plurality of instructions, including a message send instruction; and a message filtering unit coupled to the system interconnect, wherein the message filtering unit comprises storage circuitry configured to store captured identifier information from each processor of the plurality of processors. In response to a processor of the plurality of processors executing a message send instruction, the processor is configured to provide a message type and a message payload to the message filtering unit, and the message filtering unit is configured to use the captured identifier information to determine a recipient processor indicated by the message payload and, in response thereto, provides an interrupt request indicated by the message type to the recipient processor. In one aspect of the above embodiment, each processor is configured to store identifier information and provide updated identifier information to the filtering unit when an update of the stored identifier information is performed by the processor. In a further aspect, the updated identifier information is stored as captured identifier information for the processor in the storage circuitry. In another further aspect, each processor is configured to transmit the stored identifier information to the filtering unit on the system interconnect using an idle bus transaction when an update of the stored identifier information occurs. In another further aspect, each processor is a multi-threaded processor configured to execute a first thread and a second thread, wherein the stored identifier information comprises a first set of identifier information corresponding to the first thread and a second set of identifier information corresponding to the second thread. In yet a further aspect, the message type and message payload provided by the processor to the message filtering unit corresponds to the first thread or the second thread, based on which thread executed the interrupt message instruction. In yet an even further aspect, the interrupt request provided by the filtering unit corresponds to the thread which executed the message send instruction. In another aspect of the above embodiment, the data processing system is a hypervisor based system, and the captured identifier information comprises at least one of a logical partition identifier and a guest processor identifier. In a further aspect, the captured identifier information further comprises a processor identifier. In another aspect of the above embodiment, the captured identifier information comprises a processor identifier. In another aspect of the above embodiment, the processor is configured to transmit the message type and message payload over the system interconnect as an idle bus transaction. In yet another aspect of the above embodiment, the message filtering unit is external to the plurality of processors.

In another embodiment, a data processing system is configured as a hypervisor based system having a plurality of logical partitions, each logical partition having a corresponding guest processor. The data processing system includes a plurality of processors, each processor configured to store a logical partition identifier corresponding to a logical partition of the plurality of logical partitions and a guest processor identifier and configured to execute a plurality of instructions, including a message send instruction; and a message filtering unit coupled to the system interconnect and comprising storage circuitry configured to store a captured logical partition identifier and a captured guest processor identifier for each processor of the plurality of processors. In response to a processor of the plurality of processors executing a message send instruction, the processor is configured to provide a message type and a message payload to the message filtering unit, and the message filtering unit is configured to use the captured local partition identifier and the captured guest processor identifier to determine a recipient processor of the plurality of processors as indicated by the message payload and, in response thereto, provide an interrupt request indicated by the message type to the recipient processor. In one aspect of the another embodiment, each processor is configured to provide an updated logical partition identifier to the message filtering unit when the logical partition identifier is updated by the processor, and wherein the updated logical partition identifier is stored as the captured local partition identifier by the message filtering unit. In another aspect, each processor is configured to provide an updated guest processor identifier to the message filtering unit when the guest processor identifier is updated by the processor, and wherein the updated guest processor identifier is stored as the captured guest processor identifier by the message filtering unit. In another aspect, each processor is configured to transmit the stored identifier information to the filtering unit on the system interconnect using an idle bus transaction when an update of the stored identifier information. In yet another aspect, each processor is a multi-threaded processor configured to execute a first thread and a second thread, wherein the stored logical partition identifier and guest processor identifier correspond to the first thread, and wherein each processor is configured to store a second logical partition identifier corresponding to the second thread and a second guest processor identifier corresponding to the second thread. In a further aspect of the yet another aspect, the message type and message payload provided by the processor to the message filtering unit corresponds to the first thread or the second thread, based on which thread executed the interrupt message instruction, and the interrupt request provided by the filtering unit corresponds to the thread which executed the message send instruction.

In yet another embodiment of the present invention, a method in a data processing system having a plurality of processors and a message filtering unit, each processor configured to store corresponding identifier information, includes capturing, by the message filtering unit, the identifier information corresponding to each processor, wherein each time a processor updates its corresponding identifier information, the message filtering unit updates the captured identifier information for the processor; receiving a message type and message payload from a processor of the plurality of processors in response to the processor executing a message send instruction; determining, by the message filtering unit, one or more recipient processors using the captured identifier information and the message payload; and providing, by the message filtering unit to the one or more recipient processors, an interrupt request indicated by the message type. In one aspect of the yet another embodiment, the data processing system is a hypervisor based system, and the captured identifier information comprises a processor identifier, a logical partition identifier, and a guest processor identifier.

What is claimed is:

1. A data processing system, comprising:
a system interconnect;
a plurality of processors coupled to the system interconnect, each of the plurality of processors configured to execute a plurality of instructions, including a message send instruction, wherein each processor is a multi-threaded processor configured to execute a first thread and a second thread; and
a message filtering unit coupled to the system interconnect, wherein the message filtering unit comprises storage circuitry configured to store captured identifier information from each processor of the plurality of processors, including identifier information having a first set of identifier information corresponding to the first thread and a second set of identifier information corresponding to the second thread, and wherein:
in response to a processor of the plurality of processors executing a message send instruction, the processor is configured to provide a message type and a message payload to the message filtering unit, and
the message filtering unit is configured to use the captured identifier information to determine a recipient processor indicated by the message payload and, in response thereto, provides an interrupt request indicated by the message type to the recipient processor, wherein the message type and message payload provided by the processor to the message filtering unit corresponds to the first thread or the second thread, based on which thread executed the message send instruction.

2. The data processing system of claim 1, wherein each processor is configured to provide updated identifier information to the filtering unit when an update of the stored identifier information is performed by the processor.

3. The data processing system of claim 2, wherein the updated identifier information is stored as captured identifier information for the processor in the storage circuitry.

4. The data processing system of claim 2, wherein each processor is configured to transmit the stored identifier information to the filtering unit on the system interconnect using an idle bus transaction when an update of the stored identifier information occurs.

5. The data processing system of claim 1, wherein the interrupt request provided by the filtering unit corresponds to the thread which executed the message send instruction.

6. The data processing system of claim 1, wherein the data processing system is a hypervisor based system, and the captured identifier information comprises at least one of a logical partition identifier and a guest processor identifier.

7. The data processing system of claim 6, wherein the captured identifier information further comprises a processor identifier.

8. The data processing system of claim 1, wherein the captured identifier information comprises a processor identifier.

9. The data processing system of claim 1, the processor is configured to transmit the message type and message payload over the system interconnect as an idle bus transaction.

10. The data processing system of claim 1, wherein the message filtering unit is external to the plurality of processors.

11. A data processing system configured as a hypervisor based system having a plurality of logical partitions, each logical partition having a corresponding guest processor, the data processing system comprising:
a plurality of processors, each processor configured to store a logical partition identifier corresponding to a logical partition of the plurality of logical partitions and a guest processor identifier and configured to execute a plurality of instructions, including a message send instruction, wherein each processor is a multi-threaded processor configured to execute a first thread and a second thread; and
a message filtering unit coupled to the system interconnect and comprising storage circuitry configured to store a captured logical partition identifier and a captured guest processor identifier for each processor of the plurality of processors, wherein the stored logical partition identifier and guest processor identifier correspond to the first thread, and wherein each processor is configured to store a second logical partition identifier corresponding to the second thread and a second guest processor identifier corresponding to the second thread wherein:

in response to a processor of the plurality of processors executing a message send instruction, the processor is configured to provide a message type and a message payload to the message filtering unit, and the message filtering unit is configured to use the captured local partition identifier and the captured guest processor identifier to determine a recipient processor of the plurality of processors as indicated by the message payload and, in response thereto, provide an interrupt request indicated by the message type to the recipient processor, wherein the message type and message payload provided by the processor to the message filtering unit corresponds to the first thread or the second thread, based on which thread executed the message send instruction.

12. The data processing system of claim 11, wherein each processor is configured to provide an updated logical partition identifier to the message filtering unit when the logical partition identifier is updated by the processor, and wherein the updated logical partition identifier is stored as the captured local partition identifier by the message filtering unit.

13. The data processing system of claim 11, wherein each processor is configured to provide an updated guest processor identifier to the message filtering unit when the guest processor identifier is updated by the processor, and wherein the updated guest processor identifier is stored as the captured guest processor identifier by the message filtering unit.

14. The data processing system of claim 11, wherein each processor is configured to transmit the stored identifier information to the filtering unit on the system interconnect using an idle bus transaction when an update of the stored identifier information.

15. In a data processing system having a plurality of processors and a message filtering unit, each processor configured to store corresponding identifier information, wherein each processor is a multi-threaded processor configured to execute a first thread and a second thread, a method comprising:

capturing, by the message filtering unit, the identifier information corresponding to each processor, wherein each time a processor updates its corresponding identifier information, the message filtering unit updates the captured identifier information for the processor, wherein the identifier information includes a first set of identifier information corresponding to the first thread and a second set of identifier information corresponding to the second thread;

receiving a message type and message payload from a processor of the plurality of processors in response to the processor executing a message send instruction wherein the message type and message payload received from the processor corresponds to the first thread or the second thread, based on which thread executed the message send instruction;

determining, by the message filtering unit, one or more recipient processors using the captured identifier information and the message payload; and providing, by the message filtering unit to the one or more recipient processors, an interrupt request indicated by the message type.

16. The method of claim 15, wherein the data processing system is a hypervisor based system, and the captured identifier information comprises a processor identifier, a logical partition identifier, and a guest processor identifier.

* * * * *